United States Patent [19]

Kajita

[11] Patent Number: 5,560,791
[45] Date of Patent: *Oct. 1, 1996

[54] TIRE AND TREAD PATTERN

[75] Inventor: Hiroaki Kajita, Nishinomiya, Japan

[73] Assignee: Sumitomo Rubber Industries, Ltd., Hyogo-Ken, Japan

[*] Notice: The term of this patent shall not extend beyond the expiration date of Pat. No. Des. 350,318.

[21] Appl. No.: 329,862

[22] Filed: Oct. 27, 1994

[30] Foreign Application Priority Data

Oct. 27, 1993 [JP] Japan .................................. 5-292800

[51] Int. Cl.⁶ ........................ B60C 9/20; B60C 101/00; B60C 103/00
[52] U.S. Cl. ...................... 152/209 R; 152/209 D; 152/531; 152/532; 152/533
[58] Field of Search ................... 152/209 R, 209 A, 152/209 D, 531, 532, 533, 535; D12/146, 147, 148

[56] References Cited

U.S. PATENT DOCUMENTS

| | | | |
|---|---|---|---|
| D. 114,741 | 5/1939 | Anderson | D12/140 |
| D. 123,827 | 12/1940 | Anderson | D12/147 |
| D. 341,361 | 11/1993 | Kuramochi et al. | D12/147 |
| D. 350,318 | 9/1994 | Kajita | D12/147 |
| 1,996,418 | 4/1935 | Hargraves | 152/209 R |
| 1,999,988 | 4/1935 | Anderson | 152/209 R |
| 2,240,866 | 5/1941 | Smith | 152/209 R |
| 3,405,753 | 10/1968 | Verdier | 152/209 A |
| 3,512,568 | 5/1970 | Delobelle | 152/532 |
| 5,032,198 | 7/1991 | Kojima et al. | 152/533 |
| 5,316,064 | 5/1994 | Tani | 152/531 |

FOREIGN PATENT DOCUMENTS 753533  7/1956  United Kingdom .................. 152/532

Primary Examiner—Steven D. Maki
Attorney, Agent, or Firm—Birch, Stewart, Kolasch & Birch, LLP.

[57] ABSTRACT

A tire and tread pattern in which the residual cornering force is minimized. The tread pattern comprises: a plurality of design cycles, each comprising a first sub-design-unit (SA) and a second sub-design-unit (SE), the first sub-design-unit (SA) comprises lateral grooves which are inclined to the same direction, the second sub-design-unit (SE) comprises lateral grooves which are inclined to the same direction but the reverse of the first sub-design-unit, the first sub-design-unit (SA) is a mirror image of the second sub-design-unit (SE), and the inclination angles of the lateral grooves in each of the sub-design-units (SA and SE) to the axial direction of the tire are gradually decreased from the circumferential center (M) to each edge (L) of the sub-design-unit.

7 Claims, 3 Drawing Sheets

TIRE AND TREAD PATTERN

The present invention relates to a tire and a tread pattern, in which the residual cornering force is minimized to improve the running stability of the tire.

BACKGROUND OF THE INVENTION

In general, when a tire is rotated under a slip angle of 0 degree, a cornering force is more or less produced. If this residual cornering force is large, a vehicle provided with such a tire is liable to become unstable during running, especially high speed straight running. It is therefore desirable to minimize a residual cornering force in view of prevention of unstable running.

Such a residual cornering force is caused by both external structure and internal structure of a tire, which are mainly the tread pattern and tread reinforcing belt, respectively.

SUMMARY OF THE INVENTION

An object of the present invention is therefore, to provide a tire in which the residual cornering force is minimized to improve the running stability of the tire.

Another object of the present invention is to provide a tread pattern, which is capable of producing a minimized residual cornering force.

According to one aspect of the present invention, a tire comprising a tread portion provided with a tread pattern, the tread pattern comprising a plurality of design cycles, each design cycle comprising a first sub-design-unit (SA) and a second sub-design-unit (SE) disposed adjacently to each other in the circumferential direction of the tire, the first sub-design-unit (SA) comprising lateral grooves which are inclined to the same direction, the second sub-design-unit (SE) comprising lateral grooves which are inclined to the same direction but the reverse of said first sub-design-unit, the first sub-design-unit (SA) being a mirror image of the second sub-design-unit (SE).

Preferably, the inclination angles of the lateral grooves in each of the sub-design-units (SA and SE) to the axial direction of the tire are gradually decreased from the circumferential center (M) to each edge (L) of the sub-design-unit.

As a result, during running, the first sub-design-units and second sub-design-units alternately contact with the ground, and the first sub-design-units produce a cornering force in a certain direction, and the second sub-design-units also produce a cornering force of the same magnitude but in the reverse direction. Therefore, the opposite cornering forces are canceled each other during tire rotation, and the residual cornering force is minimized.

DETAILED DESCRIPTION OF THE INVENTION

An embodiment of the present invention will now be described in detail in conjunction with the accompanying drawings.

Figure 1:
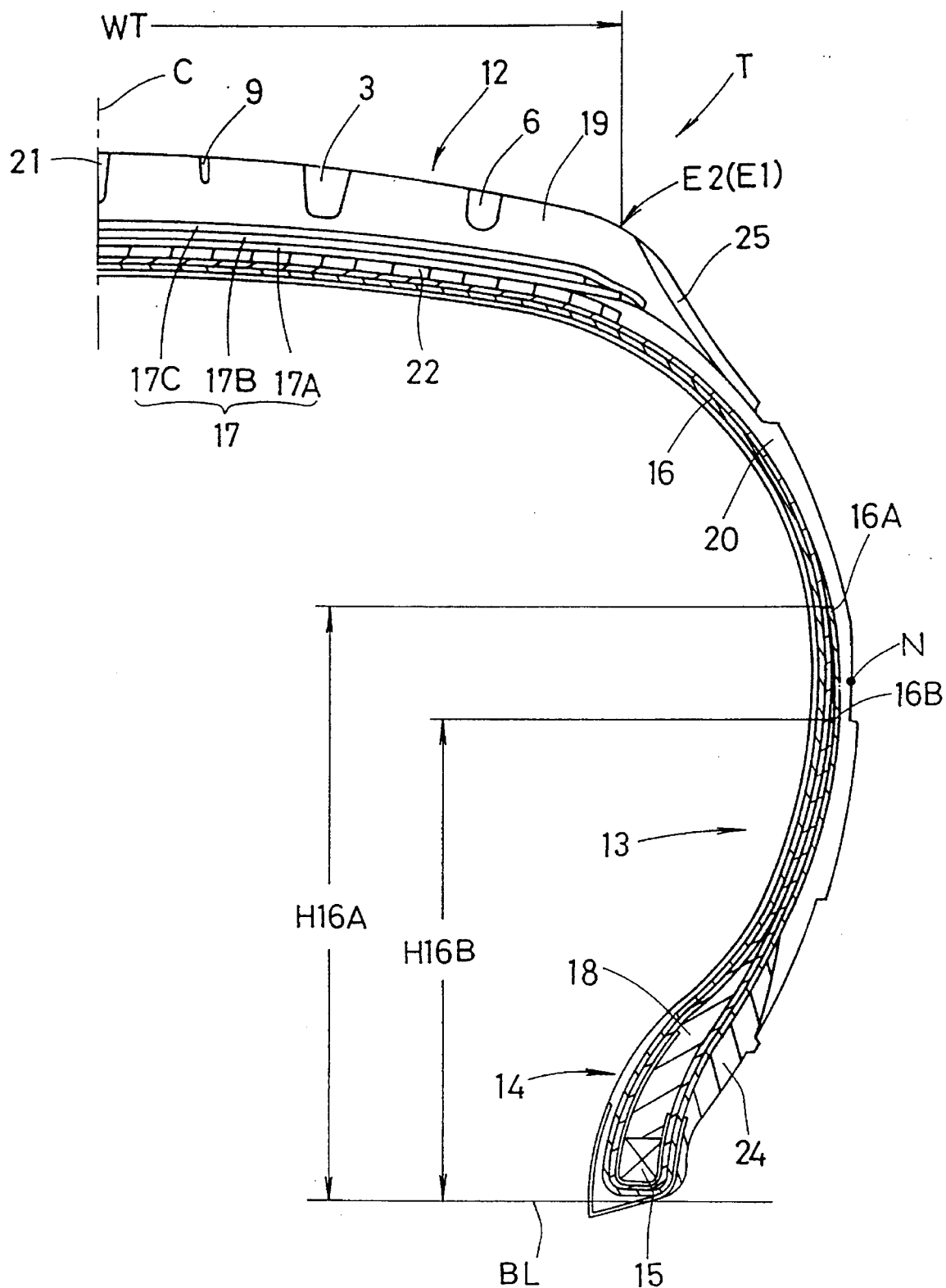
FIG. 1 is a cross sectional view of a tire according to the present invention.
Figure 2:
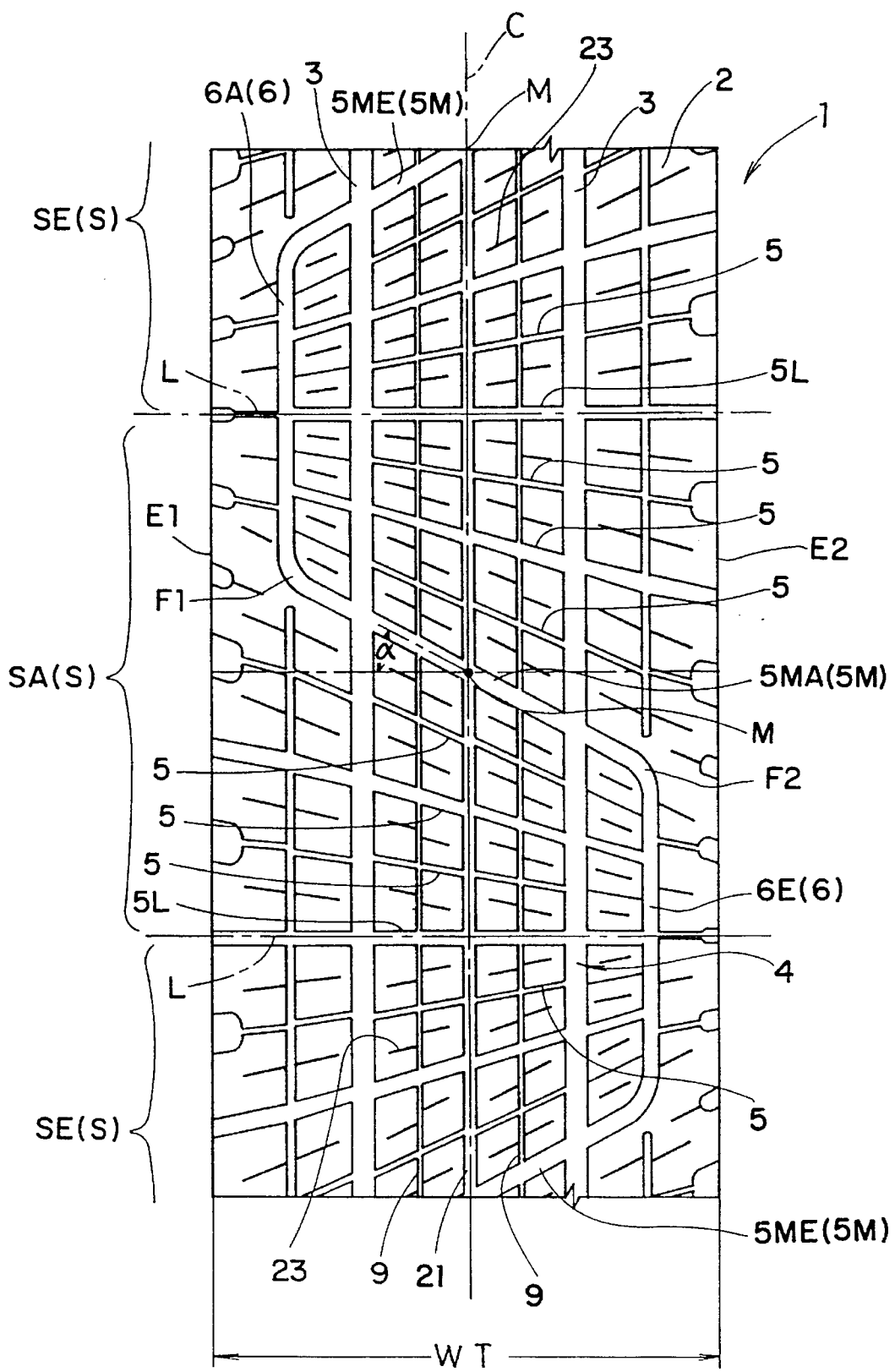
FIG. 2 is a developed plan view of the tread portion thereof showing an example of the tread pattern according to the present invention.

In FIGS. 1–2, the tire T according to the present invention is a pneumatic radial tire for 4WD vehicles.

The aspect ratio of the tire (the tire section height/the tire section width) is more than 80%, in this embodiment 70%.

The tire T comprises a tread portion 12; a pair of axially spaced bead portions 14; a pair of sidewall portions 13 extending between the tread edges E1, E2 and the bead portions 14; a pair of bead cores 15 each disposed in each of the bead portions 14; a carcass 16 extending between the bead portions 14 and turned up around the bead cores 15 from the axially inside to the outside of the tire; a bead apex 18 between the main portion and each turned up portion of the carcass 16; a belt 17 disposed radially outside the carcass 16; a tread rubber 19 disposed radially outside the belt 17 defining the tread portion 12; and a sidewall rubber 20 defining the sidewall portion 13.

The carcass 16 in this example comprises two plies of cords arranged radially at an angle of from 78 to 90 degrees, in this example 88 degrees, with respect to the tire equator C so that the cords in one ply cross the cords in the other ply.

For the carcass cords, organic fiber cords, e.g. nylon, polyester, rayon and aromatic polyamide and the like can be used. In this example, 1000 d/2 polyester fiber cords are preferably used.

Both edges of each of the two carcass plies are turned up around the bead cores 15 from the axially inside to the outside of the tire to form turned up portions 16A and 16B. The radially outer end of the axially outer turned up portion 16A is extended radially outwardly over the maximum tire section width point N. The radial height H16A thereof is in the range of from 55 to 65% of the tire section height, each from the bead base line BL, The radially outer end of the axially inner turned up portion 16B is extended radially outwardly over the radially outer end of the bead apex 18, but located radially inward of that of the outer turned up portion 16A. (H16B< H16A)

The bead apex 18 is made of hard rubber having a JIS A hardness of 60 to 90 and tapered radially outwardly from the radially outside of the bead core 15 to its radially outer end.

The belt 17 comprises a breaker belt (17A, 17B). The breaker belt consists of two cross plies 17A and 17B. The radially inner ply 17A is made of steel cords laid in parallel each other with inclining at an angle of 16 to 28 degrees with respect to the tire circumferential direction. The radially outer ply 17B is made of steel cords laid in parallel each other with reversely inclining at an angle of 16 to 28 degrees with respect to the tire circumferential direction to cross the cords of the inner ply 17A. The inner ply 17A is wider than the outer ply 17B, and the width of the widest inner ply is the substantially same as the tread width WT. Here, the tread width WT is between the tread edges E1 and E2, that is, the maximum ground contacting width between the axial outermost edges of the ground contacting region under such a condition that the tire is mounted on its standard rim and inflated to its standard pressure, and then loaded with a standard load. The standard rim is a rim officially approved for the tire by, for example JATMA (Japan), TRA (USA), ETRTO (Europe) and the like, and the standard inner pressure and the standard load are the maximum air pressure and the maximum tire load for the tire officially specified in Air-pressure/Maximum-load Table by the same associations.

In this example, in order to minimize the residual cornering force caused by the inclined breaker belt cords, the belt 17 further includes a band belt 17C disposed on the radially outside of the breaker belt 17B to define the radially outermost belt layer having a substantially zero degree cord inclination.

The band belt 17C has a jointless structure formed by spirally winding one or more cords around the breaker belt (17A, 17B).

The one or more cords to be wound are embedded in rubber in a form of ribbon or continuous narrow strip.

Such a cord ribbon is spirally wound continuously from one edge to the other edge of the band belt 17C to have the same winding direction across the whole width thereof.

Alternatively, using two ribbons, each ribbon is spirally wound continuously from one edge of the band belt 17C to the tire equator so that the winding direction and cord inclination are reversed at the tire equator. For example, the right band half has a right side upward inclination and the left band half has a left side upward inclination or vice versa.

For the band belt cords, organic fiber cords, e.g. nylon, polyester, rayon, aromatic polyamide and the like can be used.

The inclination of the band cord(s) is preferably 0+−5 degrees with respect to the tire circumferential direction.

The band belt 17C has a width being slightly wider than the maximum width of the breaker belt so as to cover the edges of the breaker plies 17A and 17B.

As a result, the residual cornering force due to the belt 17 is minimized since the radially outermost belt cords are substantially parallel to the tire circumferential direction.

Further, in this embodiment, an insulation layer 22 is disposed between the belt 17 and the carcass 16. The insulation layer 22 is made of rubber having a thickness of 2 to 4 mm. The width of the insulation layer 22 is the same as or slightly wider than the maximum width of the breaker belt 17A.

As a result, the residual cornering force due to the existence of the stiff belt 17 is decreased. Further, if tread grooves in the ground contacting region as a whole have a certain inclination which generates a residual cornering force in a certain direction, the magnitude thereof is decreased.

The above-mentioned tread rubber 19 is disposed on the radially outside of the belt 17, having tapered axial edges each placed on the outside of a radially outer part of a sidewall rubber 20. The sidewall rubber 20 has a radially outer edge interposed between the belt edge and the insulation rubber layer 22 to provide the function of a breaker cushion. The tapered edge of the tread rubber 19 is covered by a tread wing rubber 25 disposed on the tapered edge and the sidewall rubber 20. The radially outer end of the tread wing rubber 25 is placed in the range of 0 to 15 mm from the tread edge (or the axial edge of the ground contacting width). The radially inner edge of the sidewall rubber 20 is tapered and overlapped with the tapered radial outer edge of a clinch rubber 24. The clinch rubber 24 is disposed axially outside of the carcass turned up portion and extends to the bead base.

The above-mentioned tread portion 12 is provided with a tread pattern 1.

FIG. 2 shows one design cycle or design unit thereof. By successively arranging a plurality of design units around the tire tread, a complete tread pattern is formed.

The tread pattern 1 in this embodiment comprises: a pair of continuous main grooves 3, each extending straight in the tire circumferential direction and disposed on each side of the tire equator C at the same axial distance from the tire equator; a continuous central groove 21 extending straight in the circumferential direction along on the tire equator C and having a width smaller than that of the main grooves 3; and lateral grooves 5 each extending straight across the pair of main grooves 3 and central groove 21.

In FIG. 2 showing one design unit, for the convenience of explanation, two imaginary boundary lines L extending straight in parallel to the tire axial direction are drawn, and hereinafter the region therebetween is referred as sub-unit SA and the adjacent region as sub-unit SE (one half is shown on each side of the region SA), and generically the sub-units SA and SE are referred as S.

In each of the sub-units S, the above-mentioned lateral grooves 5 are arranged such that the closer the groove position to the adjacent boundary line L, the smaller the inclination angle to the tire axial direction.

All the lateral grooves in one of the sub-units S are inclined to the same direction. However, between the adjacent sub-units SA and SE, the inclinations are reversed. For example, the lateral grooves in the sub-unit SA have a left-side-upward inclination, but the lateral grooves in the sub-unit SE have a right-side-upward inclination.

A lateral groove 5M, which extends through a central point M between the boundary lines L in the tire circumferential direction located on the tire equator C, has a maximum inclination angle (alpha), which is in the range of about 20 to 40 degrees, in this example 25 degrees. The lateral groove 5MA in the sub-unit SA with a maximum left-side-upward inclination and the lateral groove 5ME in the sub-unit SE with a maximum right-side-upward inclination have axial ends, each groove having a left-side end and a right-side end. The adjacent left-side ends which are closely located in the circumferential direction are connected with a circumferential groove 6A (6) extending therebetween, and the adjacent right-side ends which are closely located in the circumferential direction are also connected with a circumferential groove 6E (6) extending therebetween. The joint portions F1, F2 thereof are rounded as shown in FIG. 2. As a result, a continuous groove having a trapezoidal-wave configuration is formed.

In this example, the number of the lateral grooves 5 disposed between the boundary lines L and the lateral grooves 5M (5MA, 5ME) is three. One of them located between the remaining two is wider and extends from the circumferential groove 6 to the tread edge E1, E2 on the other side, and the remaining two grooves extend from the circumferential groove 3 to the tread edge. The inclination angles of those three grooves gradually increase toward the center M from the boundary lines L.

In this example, the tread pattern 1 further comprises a lateral groove 5L extending along on each of the boundary lines L, and a straight side 9 extending continuously in the tire circumferential direction and disposed between the central groove 21 and each of the main grooves 3. The lateral groove 5L extends from one tread edge E1 to the other tread edge E2. Furthermore, between the adjacent lateral grooves 5, straight sipes 23 having a middle inclination angle between the inclination angles of the adjacent lateral grooves 5, are provided. The circumferential side 9 is a slit having a groove width of from 1.0 to 2.0 mm and a depth of from 0.6 to 0.8 times the depth of the main grooves 3. The lateral sipe 23 is a slit having no substantial width. By the provision of the sipes 9 and 23, wet grip performance and mud/snow performance are improved.

As a result, as shown in FIG. 2, the lateral grooves and lateral sipes between the lateral grooves 5MA and 5ME are arranged in a radial manner.

According to the invention, the sub-unit SA is formed in a mirror image of the sub-unit SE. And the design unit shown in FIG. 2 (in which one half of SE is disposed on each side of a whole SA) is symmetrical about the central point M of the sub-unit SA.

As a result, during running, the sub-units SA and sub-units SE alternately contact with the ground, and the sub-units SA produce a cornering force in a certain direction, and the sub-units SE also produce a cornering force of the same magnitude but in the reverse direction. Therefore, the opposite cornering forces are canceled each other during one tire rotation, and the residual cornering force is minimized.

As explained above, while the stiff belt 17 is disposed in the tread portion 12, the magnitude of the alternate cornering forces can be decreased by the isolation rubber layer 22.

The tread pattern according to the present invention is suitably used in a pneumatic tire for 4WD light trucks, but it can be used in other vehicles, e.g. a passenger car tire and the like.

Figure 3:
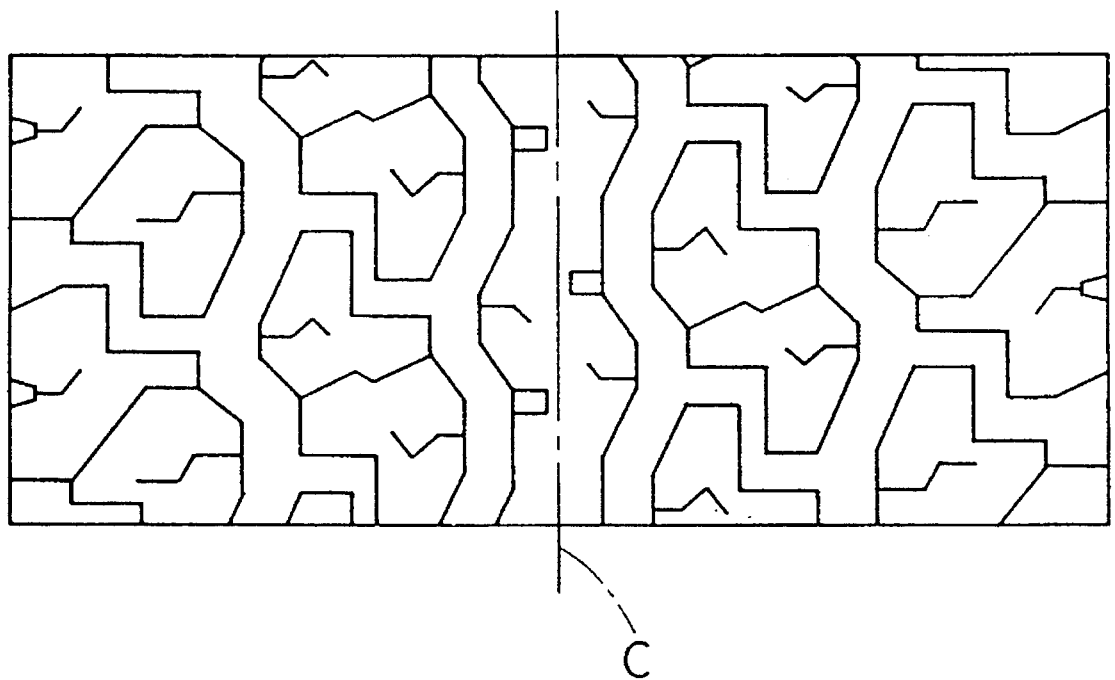
FIG. 3 is a developed view showing a tread pattern used in a comparison test.

To confirm the effects of the tread pattern according to the present invention, test tires of size 265/70R16 having the same tire construction shown in FIG. 1 excepting that the belt 17 didn't include the band belt 17B and the tread patterns shown in FIG. 2 and FIG. 3 were prepared and tested.

In the test, according to the procedure specified in the Japanese JASO-C607, the residual cornering force was measured at a speed of 10 kilometer/hour, using a flat belt tire tester. In order to obtain the residual cornering force by the tread pattern itself, in other words, to eliminate that by the belt structure, two types (A, B) of belt structures having angularly reversed cord arrangements were used in each of the test tires.

TABLE 1

| Tire | Ex. | Ref. |
|---|---|---|
| Overall CF | | |
| Belt type (A) | +120 | +160 |
| Belt type (B) | −120 | −80 |
| Residual CF | | |
| by belt | +−120 | +−120 |
| by pattern | 0 | +40 | unit N

From the tests, it was confirmed that the tread pattern according to the invention produces no residual cornering force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tire comprising a tread wherein the tread includes a plurality of design cycles, each design cycle comprising a first sub-design-unit (SA) and a second sub-design-unit (SE) disposed adjacent to each other in the circumferential direction of the tire, said first sub-design-unit (SA) comprising a first plurality of lateral grooves which are inclined in a left-side-upward inclination direction, said second sub-design-unit (SE) comprising a second plurality of lateral grooves which are inclined in a right-side-upward inclination direction which is an opposite direction to the upward inclination direction of said first sub-design-unit, said first sub-design-unit (SA) being a mirror image of said second sub-design-unit (SE), each of said first and second sub-design-units (SA and SE) has a pair of circumferential edges with a circumferential center (M) located therebetween, and the inclination angles of said first and second plurality of lateral grooves in said first and second sub-design-units (SA and SE), respectively, to the axial direction of the tire are gradually decreased from the circumferential center (M) to an adjacent circumferential edge (L) thereof, each of said first and second plurality of lateral grooves includes a circumferential center lateral groove, said circumferential center lateral groove extending through the circumferential center (M) and having the maximum inclination angle (alpha), and each pair of circumferentially adjacent circumferential center lateral grooves are connected at their axial ends with a discontinuous circumferential groove (6) so that said circumferential center lateral grooves (5M) and circumferential grooves (6) form a continuous groove having a trapezoidal-wave configuration.

2. The tire according to claim 1, wherein the tread pattern further includes a plurality of circumferential grooves extending continuously in the circumferential direction of the tire.

3. The tire according to claim 2, wherein all of said first and second plurality of lateral grooves are straight grooves, and all of said plurality of continuous circumferential grooves are straight grooves.

4. A pneumatic tire comprising a tread portion provided with a tread pattern, a carcass extending between a pair of axially spaced bead portions through the tread portion, a belt disposed radially outside the carcass in the tread portion, said belt comprising two cross plies of parallel steel cords, an insulation rubber layer disposed radially inside said belt and radially outside the carcass, said insulation rubber layer having a thickness of 2 to 4 mm, said tread pattern comprising a plurality of design cycles, each design cycle comprising a first sub-design-unit (SA) and a second sub-design-unit (SE) disposed adjacent to each other in the circumferential direction of the tire, said first sub-design-unit (SA) comprising lateral grooves which are inclined in a left-side-upward inclination direction, said second sub-design-unit (SE) comprising lateral grooves which are inclined in a right-side-upward inclination direction which is an opposite direction to the upward inclination direction of the lateral grooves of said first sub-design-unit, said first sub-design-unit (SA) being a mirror image of said second sub-design-unit (SE), wherein each of said first and second sub-design-units (SA and SE) has a pair of circumferential edges with a circumferential center (M) located therebetween, and the inclination angles of said first and second plurality of lateral grooves in said first and second sub-design-units (SA and SE), respectively, to the axial direction of the tire are gradually decreased from the circumferential center (M) to an adjacent circumferential edge (L) thereof, and each of said first and second plurality of lateral grooves includes a circumferential center lateral groove, said circumferential center lateral groove extending through the circumferential center (M) and having the maximum inclination angle (alpha), and each pair of circumferentially adjacent circumferential center lateral grooves are connected at their axial ends with a discontinuous circumferential groove (6) so that said circumferential center lateral grooves (5M) and circumferential grooves (6) form a continuous groove having a trapezoidal-wave configuration.

5. The pneumatic tire according to claim 4, wherein said belt further includes a radially outermost cord ply having a cord inclination of substantially zero degree with respect to the circumferential direction of the tire.

6. The pneumatic tire according to claim 5, wherein said radially outermost cord ply is formed by winding one or more cords spirally and continuously from one edge to the other edge thereof so that winding direction is the same across the whole width thereof.

7. The pneumatic tire according to claim 5, wherein said radially outermost cord ply is formed by at least two cords, each of said at least two cords being wound spirally and continuously from one edge of the ply to the tire equator so that the winding direction and cord inclination are reversed at the tire equator.

* * * * *